(12) United States Patent
Schoonheere et al.

(10) Patent No.: US 7,296,828 B2
(45) Date of Patent: Nov. 20, 2007

(54) DOUBLE KNOTTING SYSTEM FOR AN AGRICULTURAL BALER

(75) Inventors: Marnix J. Schoonheere, Ichtegem (BE); Karel Naeyaert, Zedelgem (BE); Johan A. E. Vande Ryse, Bruges (BE)

(73) Assignee: CNH America LLC, New Holland, PA (US)

( * ) Notice: Subject to any disclaimer, the term of this patent is extended or adjusted under 35 U.S.C. 154(b) by 358 days.

(21) Appl. No.: 11/099,319

(22) Filed: Apr. 5, 2005

(65) Prior Publication Data

US 2006/0012176 A1  Jan. 19, 2006

(30) Foreign Application Priority Data

Apr. 7, 2004  (GB) .................................. 0407858.0

(51) Int. Cl.
*A01D 59/04* (2006.01)
(52) U.S. Cl. ............................................................ 289/2
(58) Field of Classification Search .................... 289/2; 100/8
See application file for complete search history.

(56) References Cited

U.S. PATENT DOCUMENTS

| 3,101,963 | A | * | 8/1963 | Sullivan et al. ................ 289/11 |
| 3,400,959 | A | * | 9/1968 | Grillot ............................. 289/2 |
| 4,074,623 | A | * | 2/1978 | White ............................. 100/3 |
| 4,108,062 | A | * | 8/1978 | White ........................... 100/11 |
| 4,142,746 | A | | 3/1979 | White ............................. 289/2 |
| 4,196,661 | A | * | 4/1980 | Yatcilla et al. ................. 100/4 |
| 4,765,235 | A | * | 8/1988 | Schrag et al. ................... 100/3 |

* cited by examiner

*Primary Examiner*—Shaun R. Hurley
(74) *Attorney, Agent, or Firm*—Patrick M. Sheldrake; John William Stader; Michael G. Harms (57) ABSTRACT

A double knotting method and apparatus capable of producing two successive knots in a pair of strands during one full operating cycle of a tying mechanism. The tying mechanism is comprised of a twine holder for maintaining a pair of strands in a suitable position, a cutter that co-operates with the twine holder for severing the strands during formation of successive knots, and a release mechanism for releasing the pair of strands from the twine holder before frill successive knot completion. The method and apparatus avoid twine tail formation.

11 Claims, 6 Drawing Sheets

DOUBLE KNOTTING SYSTEM FOR AN AGRICULTURAL BALER

BACKGROUND OF THE INVENTION

The present invention relates to agricultural balers and, more particularly, to a baler for forming rectangular bales having a bale knotting system using twine to bind the bales.

Rectangular bales conventionally are able to maintain their shape by means of a series of parallel extending twine loops, provided lengthways around the bales. Agricultural balers, utilizing automatic knotters by which two conventional knots are made on every loop for binding a bale, have been available for many years. U.S. Pat. No. 4,142,746, for example, discloses a tying mechanism of the conventional double knotter type. Such a tying mechanism is a complex gathering of elements such as a bill hook for forming the knot, a holder in combination with a retainer for retaining the strands when forming the knot and an arm with an integrated cutter for stripping the formed knot from the bill hook in combination with the separation of the knot from the retained strands. When a bale reaches its desired length, a knot tying cycle is initiated. During this tying cycle, two knots are formed, the first knot for closing the loop of the finished bale and the second knot for starting the loop for the next bale.

In use, such conventional knotters, while being effective in binding bales with twine, result in small pieces of twine, commonly known as twine tails, being wasted after each knotting operation. These twine tails are obtained after the second knot is formed and stripped of the bill hook by a moving stripper arm. In conventional knotters, a stripper arm with an integrated cutter is used to strip the knot from the billhook. At the same time, the cutter will cut the strands that are retained by the holder. In contrast with the forming of the second knot, no twine tails will be obtained when forming the first knot, since the strands are at that point still retained by the holder and needed for forming the second knot. The first knot is merely cut loose from the strands and dropped onto the finished bale.

Although the amount of twine wasted is not great, as the twine tails are approximately only 3 to 5 cm long, they may build up in the vicinity of the knotter and ultimately cause knotter-tying problems. In some situations the twine tails are removed from the baler when the formed bale is pushed out of the baler, then the twine tails drop on the field where they may cause or contribute to environmental pollution. Indeed, nowadays farmers often use synthetic twine instead of natural fibers. Unlike natural fibers, synthetic twine will not be broken down by atmospheric influences, and therefore, the synthetic twine tails remains longer on the field and may be picked up the next harvesting season by a baler. Eventually, the twine tails will end up in the entrails of life-stock, where they may cause digesting problems or even poisoning as a result of the chemical coloring agents contained therein. Some crops that are used for industrial processes must be prevented from being polluted with synthetic twine tails lest the harvested bale would be worthless and could not be used for further processing.

To attenuate the above disadvantages of the presence of twine tails, U.S. Pat. No. 4,805,391 discloses a system to collect the twine tails. A suction fan, connected on one side by hoses to intake units, and on the other side to a container, conveys twine tails from the knotters to the container. Such a collecting system suffers from the disadvantage that sometimes twine tails escape the action of the fan because insufficient suction power is available. The above described problems of twine tails ending up on the field or hampering the operation of the knotter system, thus still remain. Another disadvantage of this system is the necessity of providing an extra device that moreover needs to be powered to collect the twine tails. Since baler knotters are very complex devices, with a high number of elements rotating and moving in different planes, there is little or no space available for such a device in the area of the knotter.

Apart from double knotter systems forming two knots on a single loop, it has been known for many years how to close a loop around a finished bale with a single knot. The biggest disadvantage of a loop formed with one knot at the end of the baling process is that relatively high forces are applied to the twine when the bale is formed. Single knotter systems indeed require the twine to be pulled through the baling chamber and around the formed bale in order to be able to close the loop. The higher forces on the twine increase the danger of twine failure or the occurrence of misshapen knots.

On the other hand, single knotter systems have the advantage that various types of knotters may be employed, one of which being the conventional knotter already referred to in connection with the double knotter system and producing the twine tails as already explained. Moreover, another type of knotter suitable for a single knotter system is the so-called loop-knotter, producing a small loop on top of the knot. Since loop-knotters operate according to a tying principle which is different from conventional knotters, no twine tails are generated during formation of a knot. The positioning of a loop-knotter relative to the formed bale is such that the bale will pull the formed knot from the bill hook when the knot is made, cutting the formed knot loose from the remaining strand. The retained strand is then used for forming the next loop around the next forming bale.

To avoid the formation of twine tails, loop knotters unfortunately cannot readily replace the conventional knotters of a double knotter system, as the operating principle of a double knotter system cannot merely be regarded as a duplication of a single knotter system. When the two knots are formed with a conventional knotter, the bale in the baling chamber remains stationary. This means that no pulling action from the formed bale on the knot can be achieved. So pulling the knot from the bill hook as is done with a single loop-knotter is not possible.

SUMMARY OF THE INVENTION

Thus, it is a primary object of the present invention to provide a tying mechanism in the form of a double knotter system solving the above described problems by not producing any twine tails at all.

It is another object of the present invention to provide a double knotter system for an agricultural baler.

Another object of the present invention is to provide a double knotter system that is durable of construction, relatively easy to manufacture and assemble, and reliable in operation.

These and other objects are attained by providing a tying mechanism for an agricultural baler, operable to produce two successive knots in a pair of twine strands during one full operating cycle of the tying mechanism. No twine tails will be formed, preventing knotter problems occurring during the baling process. Also environmental pollution will be prevented since no twine tails will be removed from the baler.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

In the description which follows and in certain passages already set forth, the principles of the present invention will be described in terms of "twine" and "knots" formed in such twine. However, it is to be recognized that such principles extend to wire and twisted junctions of wire as well as twine and knots.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
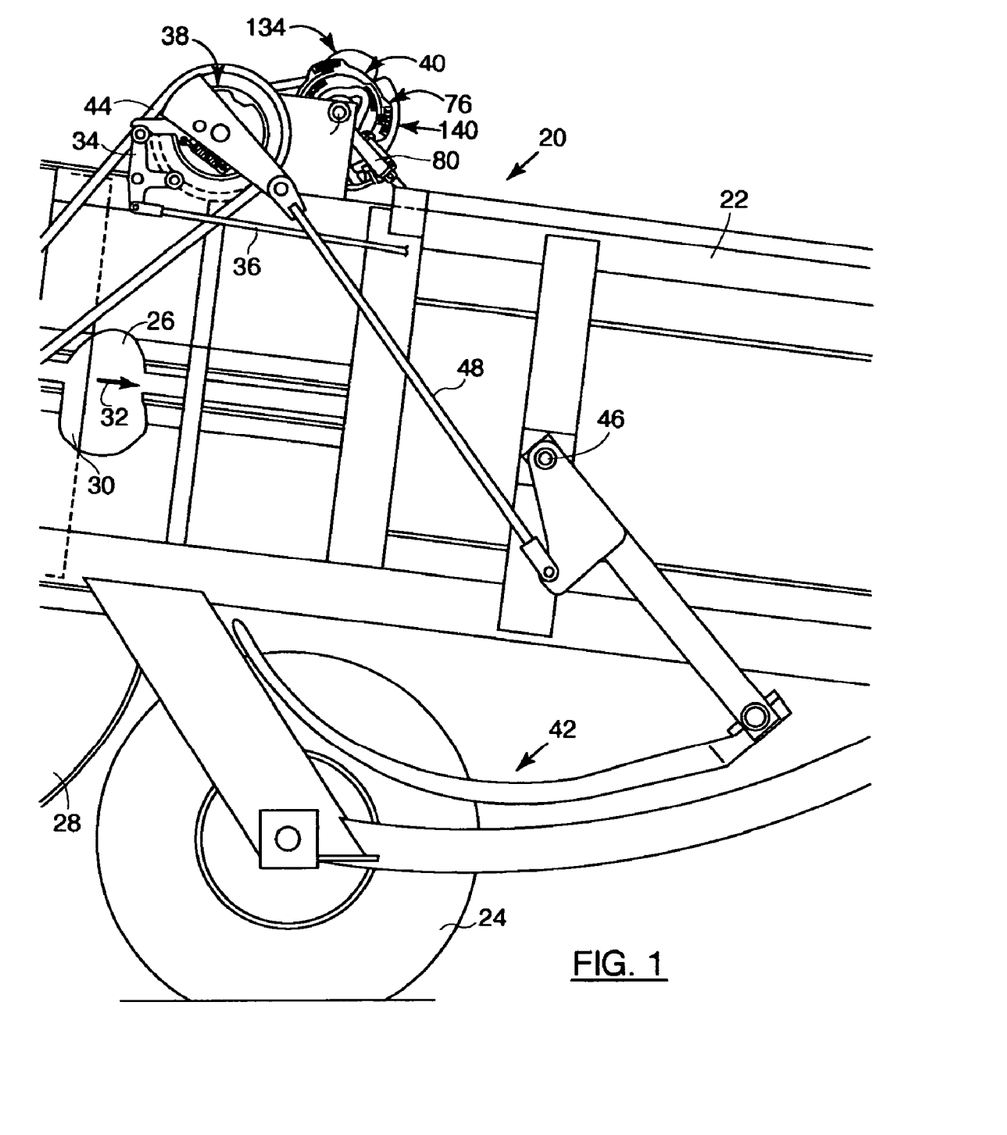
FIG. 1 is a fragmentary, side elevational view of a baler having a double knotter tying mechanism.

The baler 20 illustrated in FIG. 1 has a rectangular bale case 22 that is supported by ground wheels 24. The bale case 22 defines a bale chamber 26 wherein material is pushed though a curved duct 28. A plunger 30 reciprocates within the bale case 22 to intermittently pack fresh charges of material from the duct 28 rearwardly in the chamber 26 in the direction of the arrow 32. When the bales reaches a predetermined size (this is determined by an appropriate bale length sensor (not shown)), a trigger 34 is pulled by a rod 36. This rod 36 engages a dog clutch 38, the clutch 38 in turn being connected to a tying mechanism and a set of needles 42. As will be appreciated, the tying mechanism comprises a set of individual knotters 40 provided crosswise on top of the bale chamber 26 at spaced intervals. Each knotter 40 has an associated needle 42 for assisting in forming an individual loop around a finished bale. When the bales needs tying, the dog clutch 38 connects the knotter 40 and their needles 42 via a drive chain 44 to a source of driving power to initiate the tying operation. As the individual knotters 40 all operate in an identical manner, it suffices to describe the present invention in relation to only one such knotter 40.

Figure 18:
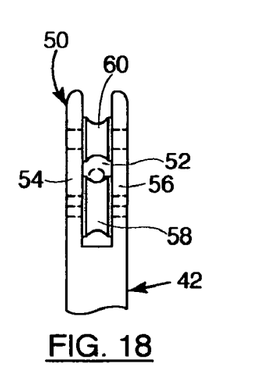
FIG. 18 is an enlarged, front elevational view of the tip of a needle which presents the strands to the knotter, illustrating details of the construction thereof.

The needle 42 is swingably mounted on the bale case 22 by a pivot 46 and is swung back and forth across the bale chamber 26 by a linkage 48, which is activated by the clutch 38. The needle 42 has an "at-home" or rest position fully below the bale case 22 as illustrated in FIG. 1 and a "full-throw" position extending completely across the bale case 22 as illustrated, for example, in FIG. 9. As illustrated perhaps most clearly in FIGS. 4 and 18, the tip 50 of needle 42 has an eyelet 52 defined therein by the opposed furcations 54 and 56 of the bifurcated tip 50 in conjunction with a pair of longitudinally spaced, transversely extending rollers 58 and 60. It will be noted that the roller 58 is positioned inwardly from the outer extremity of the tip 50, while the roller 60 is positioned outwardly from the roller 58 more closely adjacent this extremity. Even so, the roller 60 is positioned a short distance inwardly from the outer extremity of the tip 50, and both of the rollers 58 and 60 may be tapered toward their mid points, comparable to a diabolo, so as to provide secure seats for the tying strands.

Figure 2:
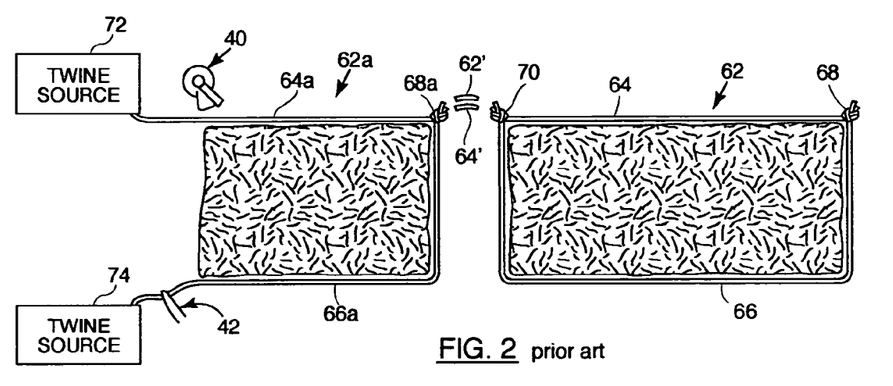
FIG. 2 is a diagrammatic view of a complete and a partial double-knotted loop as known from the prior art.

FIG. 2 shows the binding loop as already known for many years in the prior art. It is also shown in FIG. 2 that twine tails 62' and 64' are obtained between the last knot 70 of a first bale and the first knot 68a of a next bale. As clearly seen in FIG. 2, both knots 70 and 68a are identical to each other and are so-called conventional knots.

Figure 3:
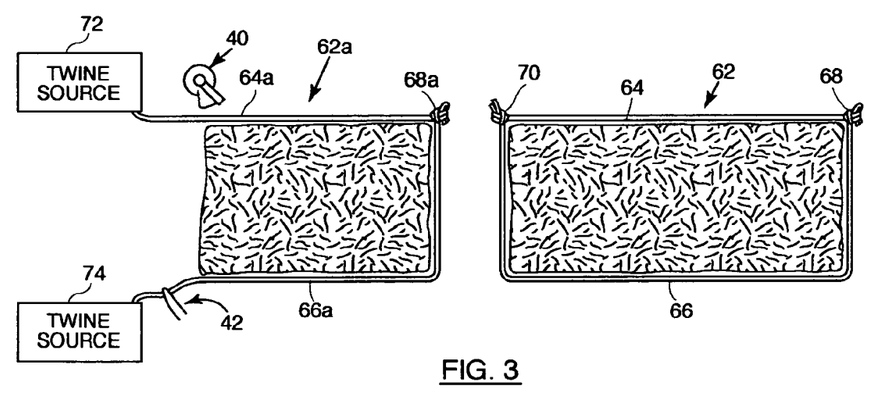
FIG. 3 is a diagrammatic view of a complete and a partial double-knotted loop without the forming of twine tails 62' and 64' as seen on FIG. 2.

In contrast therewith, FIG. 3 shows the binding loop without twine tails 62' and 64', as obtained by the present invention. In a finished bale, and still comparable to the prior art, the loop 62 is made from two strands of binding material, i.e., one strand 64 along the top side of the bale and a second strand 66 along the bottom side of the bale and its two opposite, vertical ends. The strands 64 and 66 together form the continuous loop 62. Together, they fully circumscribe the bale and are circumferential complements of one another. However, in contrast with the prior art, the first knot 68 of a bale according to the present invention, is a so called loop-knot. This means that the ends of the strands 64 and 66 of the knot 68 are released from a retained position so they can be pulled back by the movement of an arm 88 (to be described further) to form a small loop on top of the knot. The knot 68 itself, thus holds the ends of the strands 64 and 66, united with the knot 68 in contrast with a conventional knot in which the ends are cut off by a cutter 94 only a short distance from the knot. These ends are then pulled completely through the formed knot, thus forming a conventional knot as known for many years in the prior art (to be described later). As such, twine ends 62' and 64' are obtained, since these twine ends 62' and 64' are retained by the holder 86 when the cutter 94 passes. The two knots 68 and 70 appear in the loop 62 at those locations where the strands 64 and 66 are substantially end-to-end. This is typically in the area of the top corners of the bale.

With reference to FIG. 3, to the left of loop 62 is a partial loop 62a which is in the process of being formed. The top strand 64a emanates from a source of twine supply 72, while the bottom strand 66a emanates from an entirely separate, second source of twine supply 74. At the particular point in the sequence chosen for illustration, the knot 68a is in existence, and the bale is approaching that length where the needle 42 is ready to swing into operation and present the strands 64a and 66a to the knotter 40 to complete the first knot 70a (not shown in FIG. 3).

With this short explanation in mind, the details of the embodiment according to the present invention and as illustrated primarily in FIGS. 4, 5, 6 and 7 will now be described. The knotter 40 is identical in many respects to a "Deering" type knotter available from P. D. Rasspe Sohne, Hamburg, Germany. That is to say, the components of the knotter 40 which co-operate to form each of the knots of a bale may have a great resemblance to those in a unit provided by the Rasspe Company.

Figure 4:
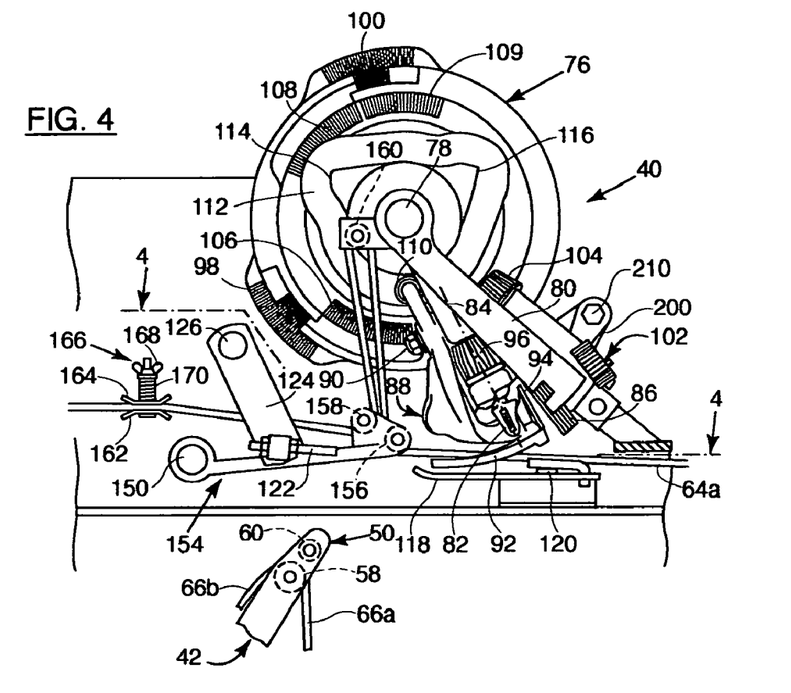
FIG. 4 is an enlarged, fragmentary, side elevational view of the knotter, needle and associated mechanism in mid cycle.

As such, the knotter 40 of FIG. 4 comprises a generally circular element 76 that is secured to a drive shaft 78 for rotation with the latter through one full revolution when the clutch 38 is engaged. The shaft 78 is supported by a forwardly inclined frame 80 attached to the top of the bale case 22, and the frame 80 also supports the knotter components for forming the knots in response to rotation of the element 76.

Briefly, such components include a rotary bill hook member 82, supported by the frame 80 for rotation about an inclined axis 84; a multi-disc holder 86 rearwardly of and adjacent to the bill hook 82 for holding strands 64a and 66a in position for engagement by the bill hook 82 during rotation of the latter; and means for releasing the connected strands from the holder 86 in the form of an arm 88 pivotally attached to the frame 80 by a bolt 90. It is to be noted that the strands 64a and 66a are held between notches in the rotating multi-disc holder 86 and a retainer 220. The tensioning force of this retainer 220 to the holder 86 can be adjusted manually by changing the tension of a leaf-spring 200 when a bolt 210 is loosened or tightened. The lower end of the arm 88 is forked, defining a crotch 92 that opens away from the holder 86 beneath the bill hook 82. The crotch 92 carries a cutter 94 between the bill hook 82 and the holder 86 for severing the strands 64a and 66a in response to swinging movement of the arm 88 in the proper direction. Such movement of the arm 88 to operate the cutter 94 also serves to bring the proximal areas of the crotch 92 in engagement with a knot formed on the bill hook 82 for stripping such knot off of the bill hook 82.

In order to transmit driving power from the element 76 to the bill hook 82, the latter is provided with a gear 96 which is disposed for meshing engagement with a pair of circumferentially spaced gear stretches 98 and 100 on the element 76. Similarly, driving power is transmitted to the discs of the holder 86 through a worm gear drive 102 and a bevel gear 104 in position for sequential meshing engagement with a pair of circumferentially spaced gear sections 106 and 108 on the element 76.

In contrast with a typical "Deering" type knotter, a supplementary gear section 109 is provided after gear section 108 (FIG. 4) for a purpose to be described further on. Power to swing the arm 88 about the pivot bolt 90 is obtained through a cam follower 110 at the upper end of the arm 88 beyond the pivot bolt 90 which is disposed within a cam track 112 on the element 76. A pair of circumferentially spaced cam shoulders 114 and 116 in the track 112 are positioned to sequentially engage the follower 110 to operate the latter.

Figure 6:
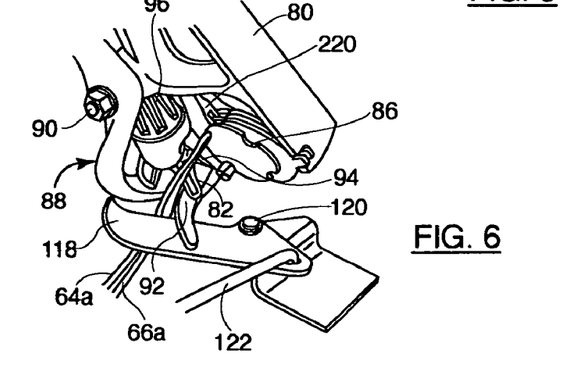
FIG. 6 is a fragmentary, front perspective view of the knotter with strands of twine draped across the bill hook and held by retaining discs in readiness of preparing a knot.
Figure 7:
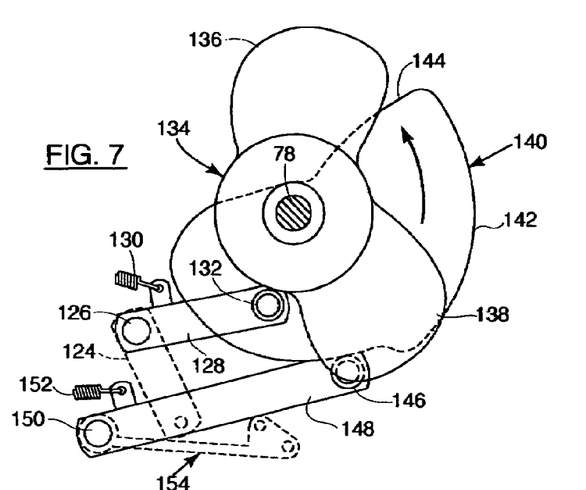
FIG. 7 is a fragmentary, elevational view of cams on a drive shaft of the knotter for operating a slack take-up arm and a twine finger.

A finger 118 is located below the bill hook 82 and the crotch 92 of the knotter 40 and is mounted on an upright pivot 120 for lateral swinging movement between a standby position illustrated in FIGS. 4 and 5 and a full-throw, laterally extended position somewhat beyond that illustrated in FIG. 6. An operating link 122 attached at one end to the finger 118 and at the opposite end to a crank 124 serves to effect swinging of the finger 118. The crank 124 is in turn fixed to a transversely extending shaft 126 that extends to a point behind the element 76 where it carries a second crank 128 as illustrated in FIG. 7. The crank 128 is biased upwardly in a counter-clockwise direction by a coil spring 130 and carries a cam follower 132 at its outermost end. The follower 132 is in position for operating engagement with a double-lobed cam 134 fixed to the shaft 78 for rotation therewith, its lobes 136 and 138 being circumferentially spaced apart in accordance with the desired timed relationship between the finger 118 and the knot-forming components of the knotter 40.

Also mounted on the shaft 78 with the cam 134 is a second cam 140 having a peripheral land stretch 142 over approximately 180° of its circumference and a peripheral valley stretch 144 over the remaining approximately 180° of its circumference. Such stretches 142 and 144 are disposed for operating engagement with a cam roller 146 located at the outer end of a lever 148 that is fixed at its inner end to a transverse shaft 150. The lever 148, and hence the shaft 150, are biased in a counter-clockwise direction viewing FIG. 7 by a coil spring 152. The shaft 150 extends back out to the opposite side of the element 76 parallel with the shafts 78 and 126 to a point substantially in fore-and-aft alignment with the bill hook 82. At that location, the shaft 150 fixedly carries a rearwardly extending slack take-up device 154. The device 154 carries a pair of spaced rollers 156 and 158 at its rearmost end around which the strand 64a is entrained as illustrated in FIG. 4. A length of the strand 64a is also looped upwardly around another roller 160 disposed above the device 154 and carried by the knotter frame 80 adjacent the drive shaft 78.

The strand 64a may be clamped between a pair of opposed plates 162 and 164 (FIG. 4) of a tensioning unit 166. The force with which the plates 162 and 164 clamp the strand 64a may be controlled by a wing nut 168 operating against a spring 170 that in turn presses against the movable plate 164. A tensioning unit similar to unit 166 may also be provided for the strand 66a, although such additional unit is not illustrated.

Figure 5:
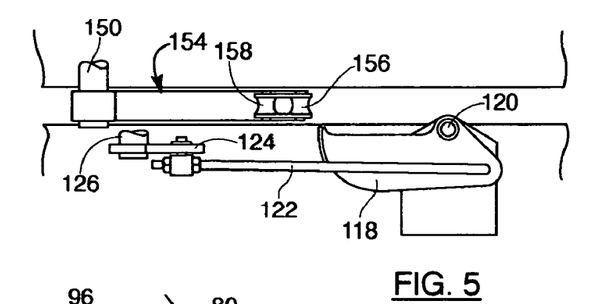
FIG. 5 is a fragmentary, plan view taken substantially along line 4-4 of FIG. 4.
Figure 8:
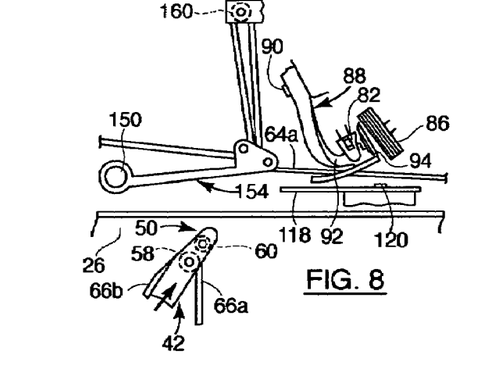
FIGS. 8 to 17 are fragmentary, schematic views illustrating the successive steps of a double-knotting operation.

The condition of the partial loop 62a in FIG. 3, and that of the knotter 40 and the needle 42, corresponds substantially with conditions illustrated in FIGS. 4, 5 and 8, with the exception that in FIG. 3, the needle 42 is still in its home position. At this point in the bale forming operation, the bale has reached its desired length and it is time to complete the loop around the bale and make the second knot in the loop. It is remarked that at this specific instance, the strand 64a stretches along the top of the bale directly beneath the crotch 92 of the arm 88 but, at least for all effective purposes, is out of contact with the knotter 40.

As illustrated in FIG. 8, as the needle 42 swings upwardly toward the knotter 40, it carries with it the strand 66a as the latter is paid out by source 74. Note that because the strand 66a is threaded through the eyelet 52 of needle 42, a length of that strand on the twine source side of the needle 42 is also carried upwardly toward the knotter 40, such extra length being hereinafter denoted 66b.

While the needle 42 approaches the knotter 40, no additional length of the strand 64a is pulled from the source 72.

Figure 9:
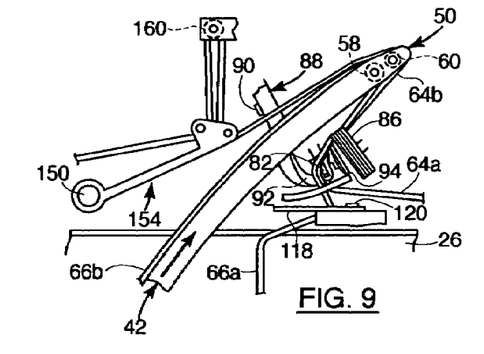
Figure 10:
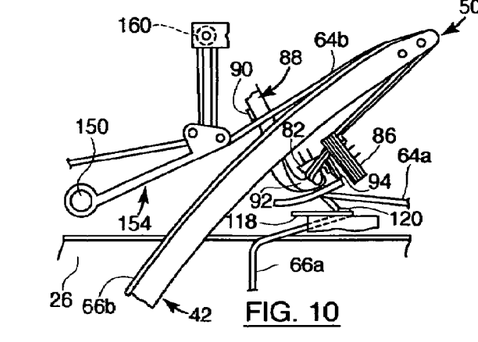
Figure 12:
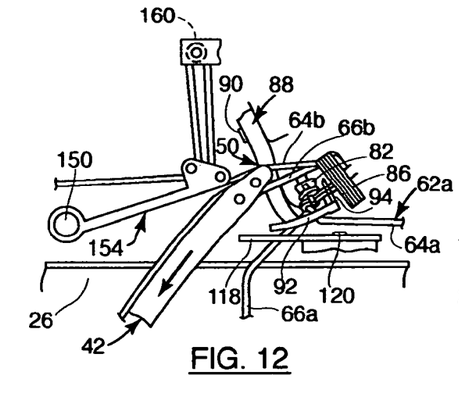

Even as the trip of the needle 42, and more particularly, the roller 60, snares the strand 64a as illustrated in FIG. 9 and presents strands 64a and 66a in unison to the knotter 40, still no additional length of the strand 64a is pulled from source 72 because the device 154 rocks upwardly in a counter-clockwise direction to provide the slack necessary in the strand 64a to accommodate the needle movement. In presenting the strands 64a and 66a, the needle actually drapes the strands across the bill hook 82 and thence into awaiting notches of the holder 86, whereupon rotation of co-operating discs in the latter, in combination with a pressing retainer 220, serve to firmly grip the strands and prevent their escape as the bill hook 82 begins its rotation as illustrated in FIG. 10. When the needle 42 delivers the strands 64 and 66 to the holder 86, the holder 86 rotates in such a manner that the strands 64 and 66 are retained twice in different notches in the holder 86 (FIG. 12). By doing so, two knots 70a and 68b can be formed during one knotting cycle as will be explained further, whereby the cutter 94 severs the strands 64a and 66a from the strands 64b and 66b after the first knot 70 is formed, and thus separating the two loops 62a and 62b (not shown) from each other. The adjustable leaf-spring 200 pushes against the retainer 220, thus co-operating with the discs in the holder 86 to retain the strands.

Figure 19:
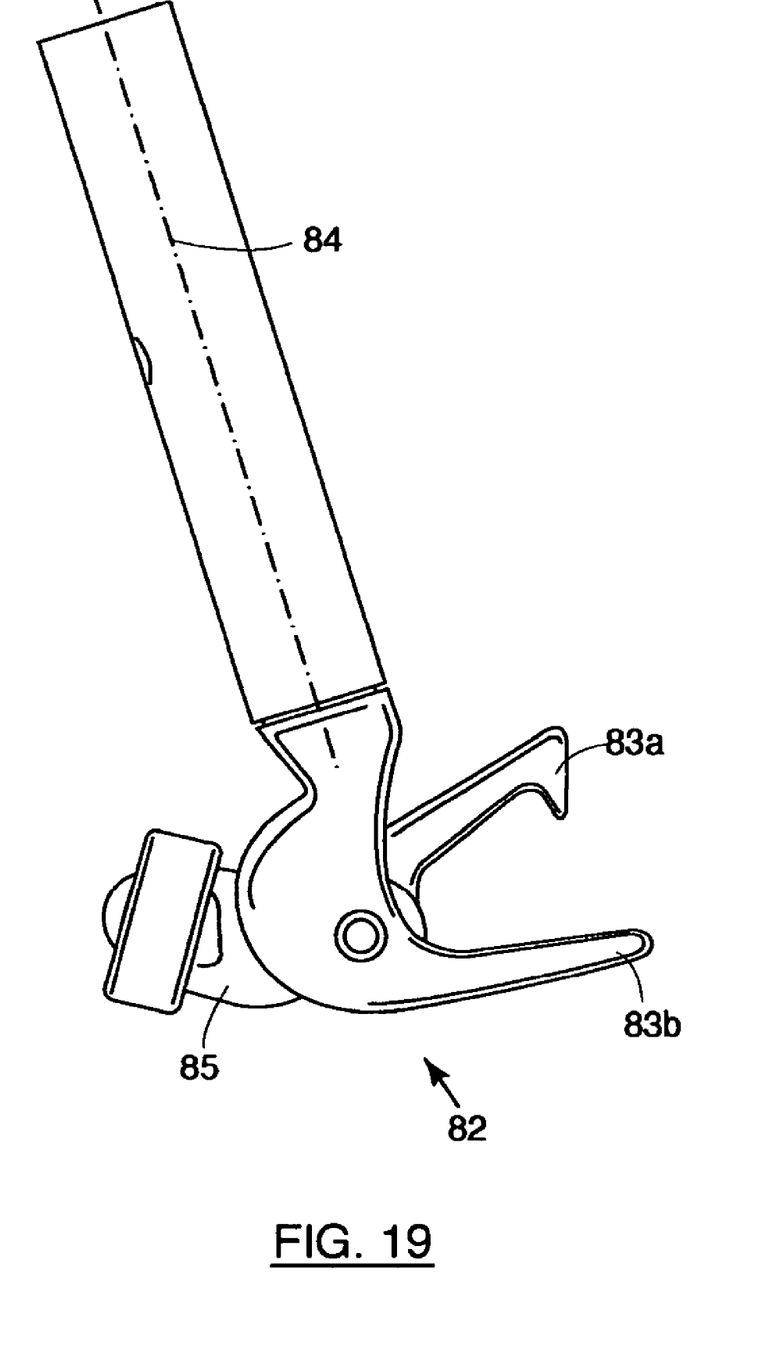
FIG. 19 is an enlarged view of the bill hook which forms the knot by turning around its lengthways axis, illustrating details of construction thereof.

When starting the formation of the first knot 70, the strands 64a and 66a are draped across the bill hook 82, thereby closing the two lips 83a and 83b (FIG. 19) of the bill hook 82 because of the pressure of the strands on the upper lip 83a. Unlike with a typical "Deering" type knotter, the two lips 83a and 83b are normally opened, unless they are closed by the strands when they are draped across the bill hook 82.

While the strands 64a and 66a are being delivered across the bill hook 82 to the holder 86, the finger 118 is actuated to swing inwardly and engage at least the strand 66a as illustrated in FIGS. 9 and 10 for the purpose of seating the same deeply within the crotch 92 so as to assure that the strands 64a and 66a are both in proper position across the bill hook 82.

When the bill hook 82 rotates around its axis 84, a cam follower 85, which is connected to the upper lip 83a, engages an element having a cam shoulder (not shown). When rotating, the cam follower will push the upper lip 83a away from the lower lip 83b, thus enabling the strands 64a and 66a to enter in between the two lips 83a and 83b while the bill hook is rotated.

Figure 11:
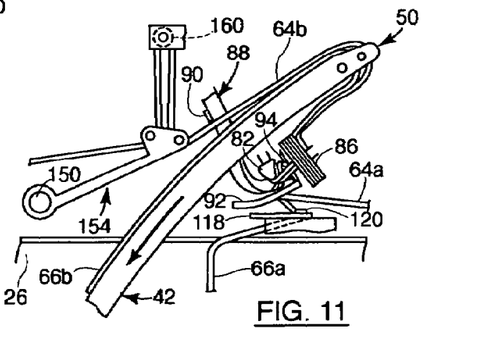
Figure 13:
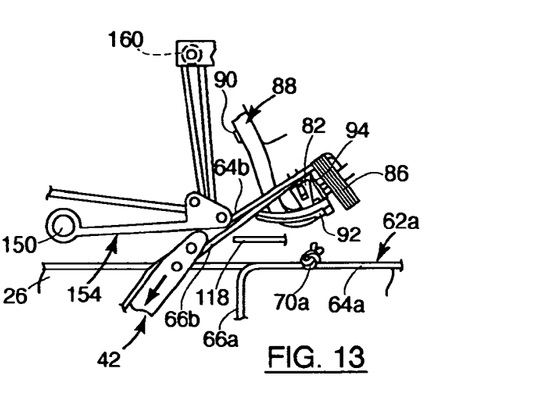

The foregoing described movement on the part of the bill hook 82 and the holder 86 are, of course, brought about by operable inter-engagement of the gear stretch 98 and gear section 106 on the element 76 with their respective gears 96 and 104 on the bill hook 82 and the holder 86. Such driving inter-engagement continues until a knot has been formed on the bill hook 82 as illustrated in FIGS. 11 and 12, by which time the needle 42 has begun to withdraw. At this point, the cam shoulder 114 of the element 76 comes into engagement with the roller 110 of the arm 88 so as to swing the bottom of the latter, and hence the cutter 94, across that portion of the strands between the bill hook 82 and the holder 86, thereby severing the same as illustrated in FIG. 12. The cutter 94 will move along the retained strands 64a and 66a, and hence cutting these strands loose from the strands 64b and 66b. With reference to FIG. 12, it will be seen that at the moment of cutting, the strands 64a and 66a extend from in between the lips 83a and 83b towards the holder 86. On account of the further rotation of the bill hook 82, the lips 83a and 83b meanwhile are closed again to clamp the strands 64a and 64b in between. Considering that the cutter 94 moves very closely alongside the bill hook 82, the free ends of the cut strands 64a and 66a extend only over a very short distance out of the lips 83a and 83b. To complete the knot formation, the arm 88 engages the strands 64a and 66a which are retained in a twisted manner around the bill hook 82. In so doing, the strand parts lying on top of the lip 83a are pulled over the strands parts laying in between the lips 83a and 83b, thereby forming the knot. As described above, since the free ends of the strand 64a and 66a are very short, they are pulled completely through the knot during its final formation, resulting in the so-called conventional knot 70a, as best seen in FIG. 13. Besides completing the knot, further motion of the arm 88 also strips the finished knot 70a completely from the bill hook 82 and drops the completed loop on the bale as illustrated in FIG. 13.

Figure 14:
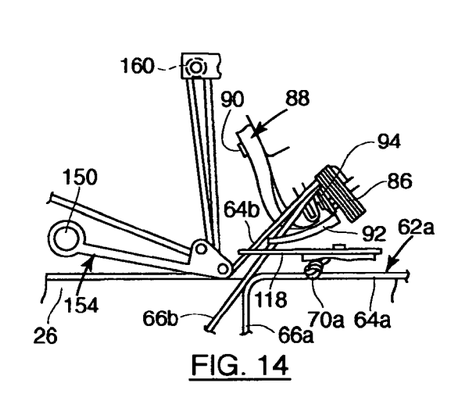
Figure 15:
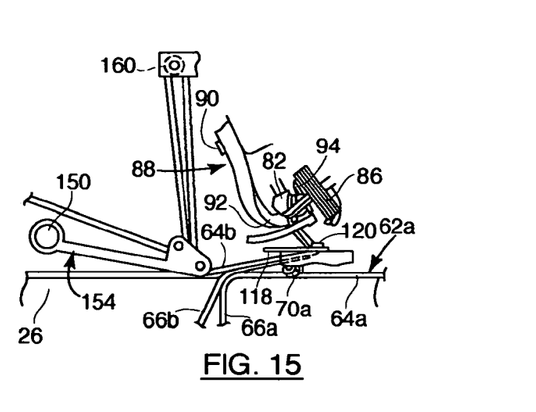
Figure 16:
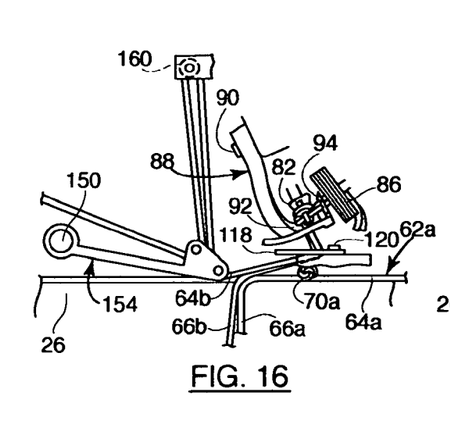

When the knot 70a is dropped by the knotter 40 following severance and stripping from the bill hook 82, the strand 66b from source 74, as well as strand 64b from source 72 is still retained in the second notch of the holder 86. At this instance, the upper lip 83a is open again. Consequently, as the needle 42 continues to retract, the strand 66b is draped downwardly across the bale chamber 26 thereby pushing the tooth 83a down, while the slack take-up device 154 lowers to its normal position to pull a small amount of additional twine from the source 72. Upon reaching the condition illustrated in FIG. 14, the strands 64b and 66b are in position for initiating the second tying cycle which is started by the finger 118 (which has been previously returned to its standby position) swinging inwardly to engage the strands 64b and 66b and seat them deeply within the crotch 92 as shown in FIG. 15. This assures that the strands 64b and 66b are properly positioned across and in engagement with the bill hook 82, whereupon the latter and the holder 86 are operated by their second respective gear stretch 100 and gear section 108 on the element 76. Thus, the second knot becomes formed as illustrated in FIG. 16, whereupon the arm 88 is once again actuated, but this time by the second cam shoulder 116. When the tension of leaf-spring 200 is set to a low value, the pressure of the retainer 220 on the holder 86 and hence the force that holds the strands fixed within the holder 86, will be minimal.

Figure 17:
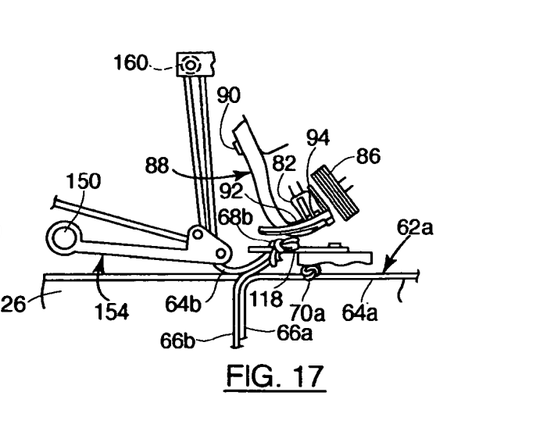

Additionally, the supplementary gear section 109 provides a prolonged operation of the holder 86 and will keep the holder 86 rotating over a longer arc. The strands 64b and 66b are no longer retained between the notch in the holder 86 and the retainer 220. Therefore, when the arm 88 starts its movement for finalizing the knot formation, the cutter 94 will not be able to effect any cutting action. Indeed, even though the cutter 94 is very sharp, it will act as a blunt knife and will not be able to cut the strands because instead of holding the strands, the holder 86 is releasing them on account of the continued rotation of the holder 86 and the low pressure of the retainer 220 on the holder 86. The strands will therefore just slide over the knife 94 without being cut, while the arm 88 continues moving and stripping of the almost completed knot from the bill hook 82, thus pulling the strands out of the holder 86. This results in the free ends of the strands 64b and 66b being considerably longer than the free ends obtained during the first knot formation. As such, upon finalizing the knot, free ends 64b and 66b no longer are pulled completely out of the knot, resulting in a so-called loop-knot 68b, as best seen in FIG. 17.

This effect may also be realized without the use of a supplementary gear section 109. When the tensioning force of the leaf spring 200 to the retainer 220 is sufficiently decreased, then the strands will also be pulled out of the holder 86 by the moving arm 88, since they are no longer sufficiently held by the holder 86.

This loop-knot 68b is the start of a new bight for the next bale. Such bight is in position to receive new material that is packed into the bale chamber 26 by the plunger 30, and the bight grows in length as additional lengths of the strands 64b and 66b are simultaneously pulled from their sources 72 and 74. Finally, when the bale has reached its desired size, the sequence returns to its starting point, whereupon the bight is closed by operation of the needle 42 to complete the loop around the bale and form the other knot.

From the foregoing, it will be appreciated that the formation of twine tails 62' and 64', as seen in FIG. 2, and as described in U.S. Pat. No. 4,142,746 was inherent only to the formation of a first knot for the next bale (or otherwise said, the second knot obtained during a full cycle of the knotter). In accordance with the present invention, by releasing the strands from the holder 86 before they can become cut during the formation of the second knot in the double-knotter cycle, the generation of twine tails 62' and 64' is avoided.

As already explained, two complete tying cycles are carried out during each single revolution of the drive shaft 78. Thus, each time the needle 42 swings into operation, two different types of knots are formed by the same knotter 40. The first formed knot is a conventional knot 70 which fully closes the loop of one bale, and the second formed knot is a loop-knot 68 on the next succeeding bale. The cutter 94 only operates to sever the two knots from one another, thereby also disconnecting the two bales from each other.

Having thus described the invention, what is claimed is:

1. A tying mechanism for a baler, operable to produce two successive knots in a pair of strands during one full operating cycle of the tying mechanism;

the tying mechanism comprising:
- a twine holder for maintaining said pair of strands in a suitable position throughout the complete formation of a first one of said two successive knots and to continue to maintain said pair of strands in a suitable position during the initial stage of the formation of a second one of said successive knots;
- a cutter co-operating with said twine holder for severing said pair of strands during formation of said first one of said two successive knots;
- a releasing mechanism to release said pair of strands from said twine holder before full completion of said second one of said two successive knots, wherein said releasing mechanism is operable to release tension on said pair of strands immediately before the cutter begins to sever said pair of strands during formation of said second one of said two successive knots; and
- a drive system to provide power and control to said twine holder, said drive system being operable to rotate said twine holder during formation of said second one of said two successive knots to a position for releasing said pair of strands.

2. The tying mechanism is of claim 1, wherein:
the tension remaining on said pair of strands after release by said releasing mechanism is insufficient for said cutter to effect a cutting action.

3. The tying mechanism of claim 1, wherein:
said releasing mechanism comprises a part of said drive system.

4. The tying mechanism of claim 3, wherein:
said drive mechanism comprises first and second gear sections provided on a circular element for controlling motion of said twine holder during the formation of said respective two successive knots;
said releasing mechanism being formed by a supplementary gear section provided on said circular element for timely engagement after operation of said first and second gear sections.

5. The tying mechanism of claim 4, further including:
a retainer co-operating with said twine holder to exert a selectable tension on said pair of strands;
said releasing mechanism further being operable to diminish the co-operating action between said retainer and said twine holder.

6. The tying mechanism of claim 5, wherein:
said two successive knots are not the same type of knot.

7. The tying mechanism of claim 6, wherein:
at least one of said two successive knots is a loop-knot.

8. The tying mechanism of claim 6, wherein:
said first one of said two successive knots is a conventional knot, and said second one of said two successive knots is a loop-knot.

9. The tying mechanism of claim 7, wherein:
said first one of said two successive knots is a conventional knot, and said second one of said two successive knots is a loop-knot.

10. A method for producing two successive knots in a pair of strands during one full operating cycle of a tying mechanism; the method comprising the steps of:
- placing said pair of stands under tension by providing a twine holder with a leaf-spring for gripping said pair of twines, said leaf-spring held in place by a bolt;
- forming a first one of said two successive knots;
- cutting said first one of said two successive knots loose from said pair of strands;
- partially forming a second one of said two successive knots;
- before completing the formation of said second one of said two successive knots, releasing said pair of strands from a twine holder, wherein said releasing step further comprises the step of releasing said bolt to reduce the tension in said pair of strands.

11. The method of claim 10, wherein:
said step of releasing said pair of strands from said twine holder further comprises the step of moving said twine holder to a position for releasing said pair of strands.

* * * * *